United States Patent
Sarhad et al.

(10) Patent No.: US 12,391,323 B1
(45) Date of Patent: Aug. 19, 2025

(54) SYSTEM AND METHOD FOR FACILITATING THE TRAVERSING OF STAIRS BY A WHEELED ROBOT

(71) Applicant: Hacor Labs LLC, Houston, TX (US)

(72) Inventors: Nikita Shardul Sarhad, Houston, TX (US); Shardul Jitendrakumar Sarhad, Houston, TX (US)

(73) Assignee: Hacor Labs LLC, Houston, TX (US)

( * ) Notice: Subject to any disclaimer, the term of this patent is extended or adjusted under 35 U.S.C. 154(b) by 0 days.

(21) Appl. No.: 19/022,408

(22) Filed: Jan. 15, 2025

(51) Int. Cl.
*B62D 57/028* (2006.01)

(52) U.S. Cl.
CPC .................. *B62D 57/028* (2013.01)

(58) Field of Classification Search
CPC .................................. B62D 57/028
See application file for complete search history.

(56) References Cited

U.S. PATENT DOCUMENTS

| | | | |
|---|---|---|---|
| 4,512,588 A | 4/1985 | Cox | |
| 4,709,773 A * | 12/1987 | Clement | B62D 55/065 280/5.2 |
| 5,515,934 A * | 5/1996 | Davis | B62D 57/024 901/50 |
| 8,327,960 B2 * | 12/2012 | Couture | B62D 55/065 180/9.1 |
| 8,413,752 B2 * | 4/2013 | Page | B62D 25/2054 180/68.5 |
| 9,527,213 B2 | 12/2016 | Luo et al. | |
| 9,567,021 B2 | 2/2017 | Malley et al. | |
| 9,957,002 B2 * | 5/2018 | Klassen | B60F 3/0007 |
| 11,548,151 B2 | 1/2023 | Whitman et al. | |
| 2024/0034117 A1 | 2/2024 | Panigrahi et al. | |
| 2024/0058943 A1 * | 2/2024 | Takasugi | B25J 5/007 |

* cited by examiner

*Primary Examiner* — Kevin Hurley

(57) ABSTRACT

A system and method for facilitating the traversing of stairs by a wheeled robot enable a wheeled robot to ascend and descend stairs. The system includes a support frame, a first movement module, and a second movement module. The support frame enables the operation of the first movement module and the second movement module. The first movement module and the second movement module enable the quick and efficient movement on flat surfaces. The first movement module and the second movement module also enable the traversing of stairs without compromising the effectiveness of movement on flat surfaces. The first movement module and the second movement module each includes a drive mechanism, an inner wheeled leg, and an outer wheeled leg. The drive mechanism enables the independent, unhindered, and continuous rotation of the corresponding wheeled legs and wheels without the implementation of wiring, electronics, or rotary connectors within the wheeled legs.

11 Claims, 15 Drawing Sheets

SYSTEM AND METHOD FOR FACILITATING THE TRAVERSING OF STAIRS BY A WHEELED ROBOT

FIELD OF THE INVENTION

The present invention relates generally to robotics and control systems. More specifically, the present invention discloses a system that enables a wheeled robot to independently traverse stairs.

BACKGROUND OF THE INVENTION

In the field of robotics, the ability for a robot to ascend and descend steps is many times useful, but highly challenging. Traversing stairs can be especially difficult for wheeled robots with non-flexible legs that cannot mimic human or animal motion. Many robots have been developed to traverse stairs that use bipedal or quadrupedal systems to mimic human and animal motion, respectively. Unfortunately, these bipedal or quadrupedal robots require relatively complex mechanical structures as well as a highly complex control systems to maintain balance and perform movement of multiple legs in coordination. Other robots use several wheels/legs on multiple axes of rotation that require significant amount of physical space, making these robots impractical for many environments. Even after decades of innovations in the field of robotics, these robots are unable to fully and continuously rotate all the limbs, limiting the usefulness and efficiency in traversing stairs. Additionally, many prior designs for wheeled robots that climb steps significantly compromise the ability to smoothly and quickly move on flat surfaces. In addition, previous designs traverse stairs and flat surfaces too slowly to be useful in many applications. So, a solution for a wheeled robot that can traverse stairs and flat surfaces using practical and compact mechanisms on flat surfaces as well as the ability to ascend and descend steps is necessary.

Therefore, an objective of the present invention is to provide a system and method for facilitating the traversing of stairs by a wheeled robot that enables a wheeled robot to traverse stairs with a simpler mechanical structure and a practical control system. The present invention provides a more efficient solution that is compact and efficient at traversing stairs without compromising movement on flat surfaces. The present invention also eliminates the need for electrical and electronic components on the robot's limbs. The present invention implements two or more pairs of wheeled legs rotated in a coordinated fashion to allow the robot to traverse stairs. Each wheeled leg is implemented in such a way that the corresponding proximal end rotates in the same axis of rotation, with both the wheels and legs being able to rotate independently and continuously. Further, the system of the present invention enables the implementation of the wheeled leg pairs in such a way that each wheeled leg can continuously and independently rotate both legs and wheels in either direction without hindrance. Additional features and benefits of the present invention are further discussed in the sections below.

SUMMARY OF THE INVENTION

The present invention discloses a system and method for facilitating the traversing of stairs by a wheeled robot. In the preferred embodiment, the present invention includes a main body, and four wheeled legs mounted onto the main body in such a way that the proximal end of each wheeled leg rotates in the same rotation axis but on different planes. To climb stairs, the main body is balanced on two wheeled legs in an upright position while the other two wheeled legs rotate about the common rotation axis to engage a higher step. As the rotating wheeled legs engage the higher step, the main body is lifted towards the higher step, at which point the rotating legs are then used to balance the main body, and the other wheeled legs are rotated. This process is repeated to climb stairs, and the process can be reversed to descend stairs.

Each of the wheeled legs of the present invention is designed so that the leg portion performs both climbing and balancing functions, while the wheel portion performs both balancing and translation functions. While on a flat surface, the main body of the present invention can stand and move using all four wheeled legs or balance on a pair of wheeled legs to move and turn quickly in any direction using control techniques that are common in the field. Further, each wheeled leg is implemented without the use of wiring, electronics, or rotary connectors.

DETAIL DESCRIPTIONS OF THE INVENTION

Figure 1:
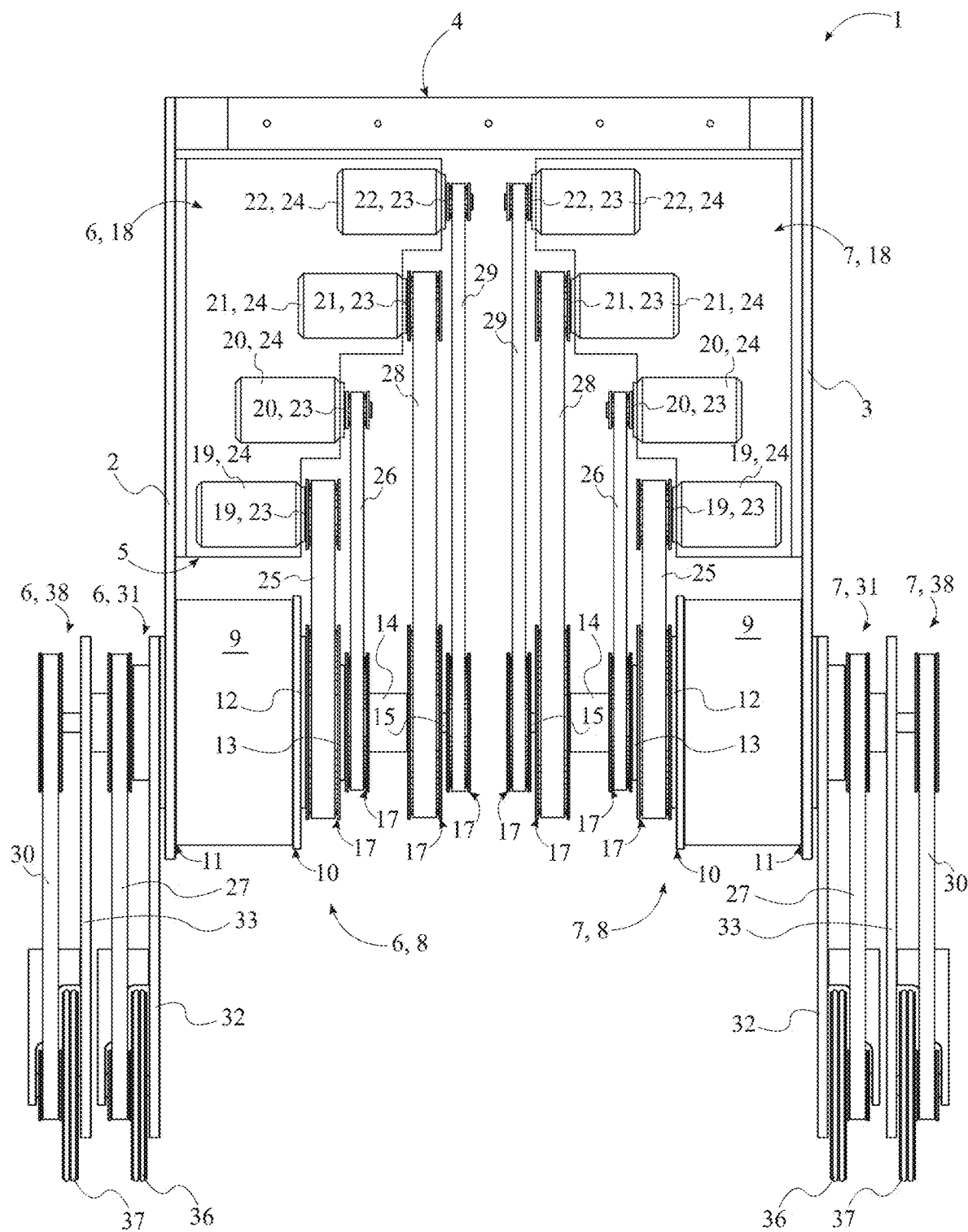
FIG. 1 is a front view of the system of the present invention.
Figure 2:
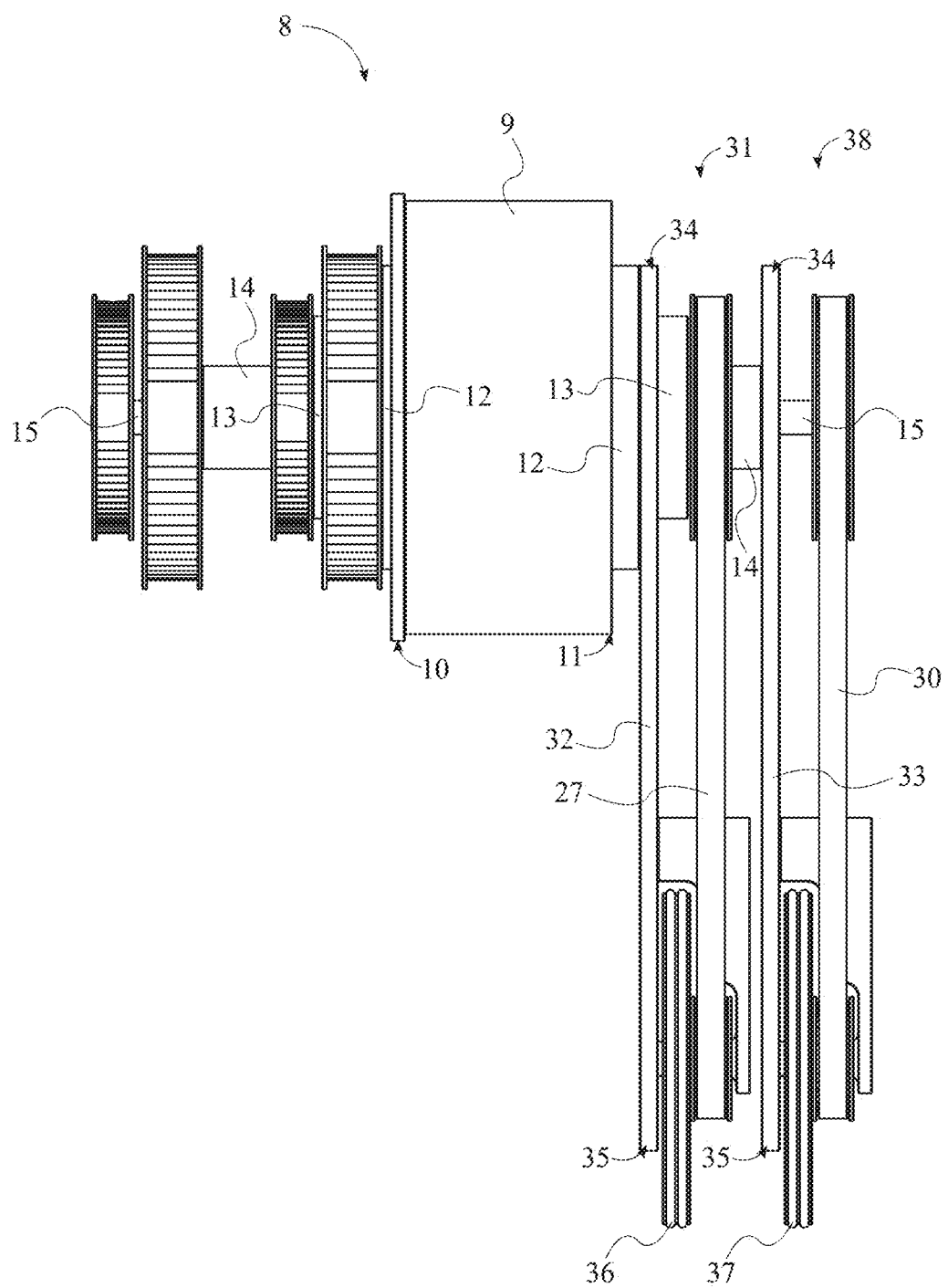
FIG. 2 is a front view of a movement module of the system of the present invention, wherein the shaft assembly, the inner wheeled leg, and the outer wheeled leg of the movement module are shown.
Figure 3:
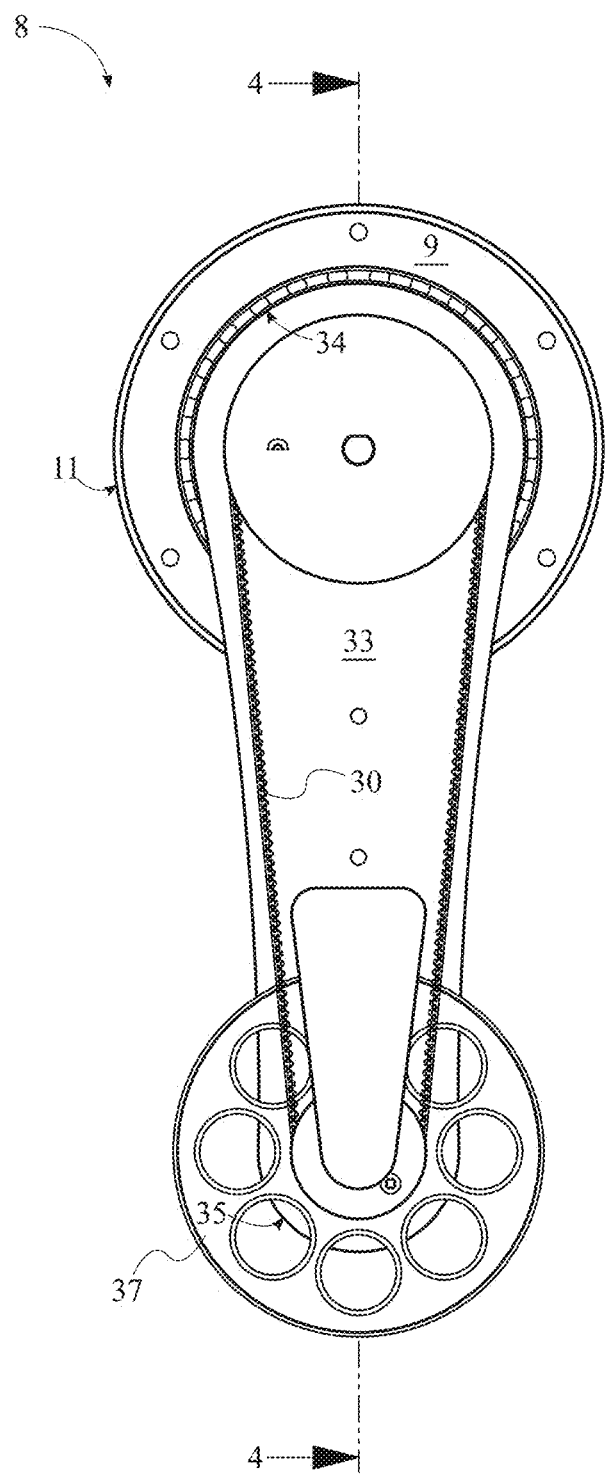
FIG. 3 is a side view of a movement module of the system of the present invention.
Figure 4:
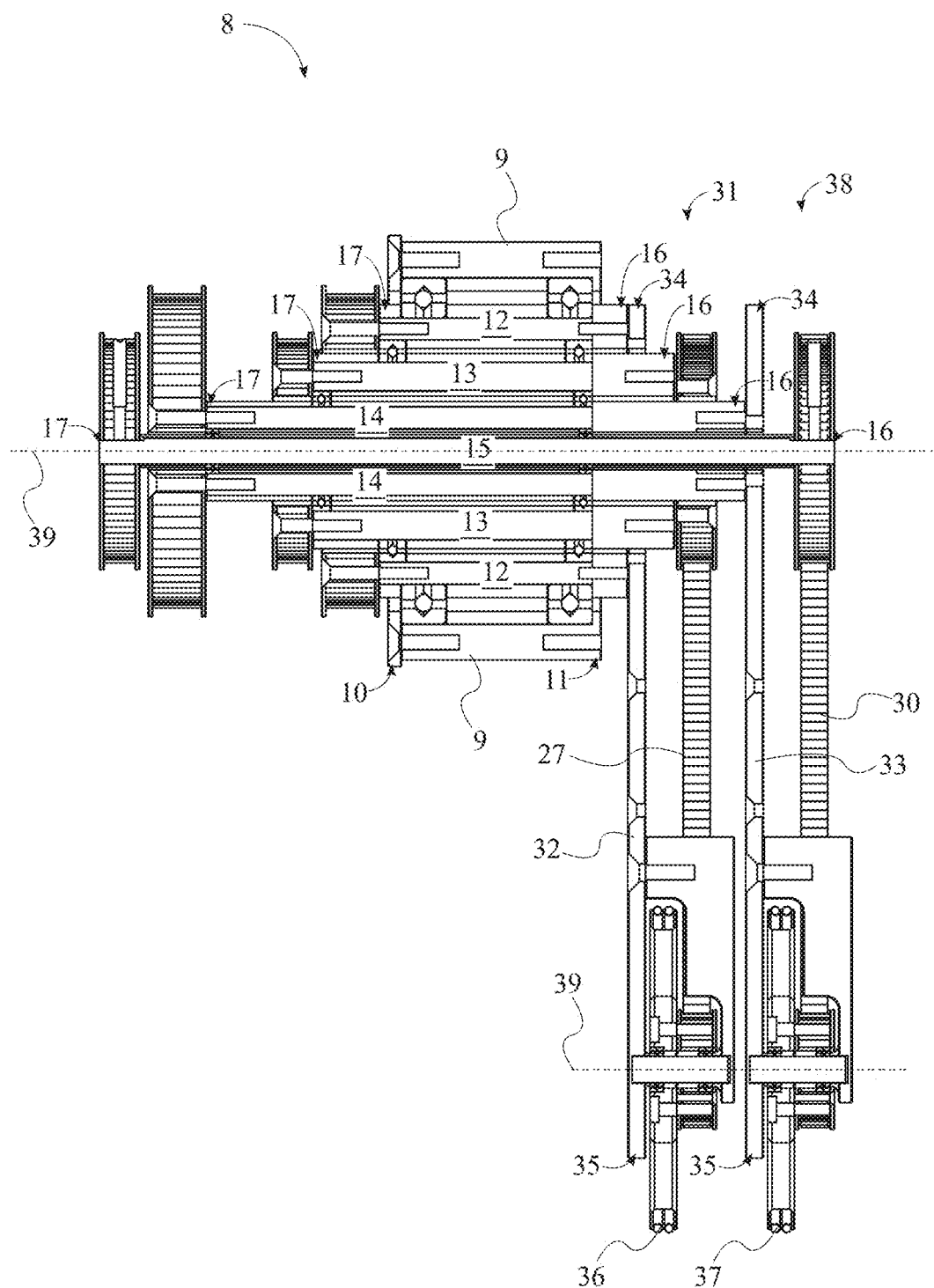
FIG. 4 is a vertical cross-sectional view taken along line 4-4 shown in FIG. 3.
Figure 5:
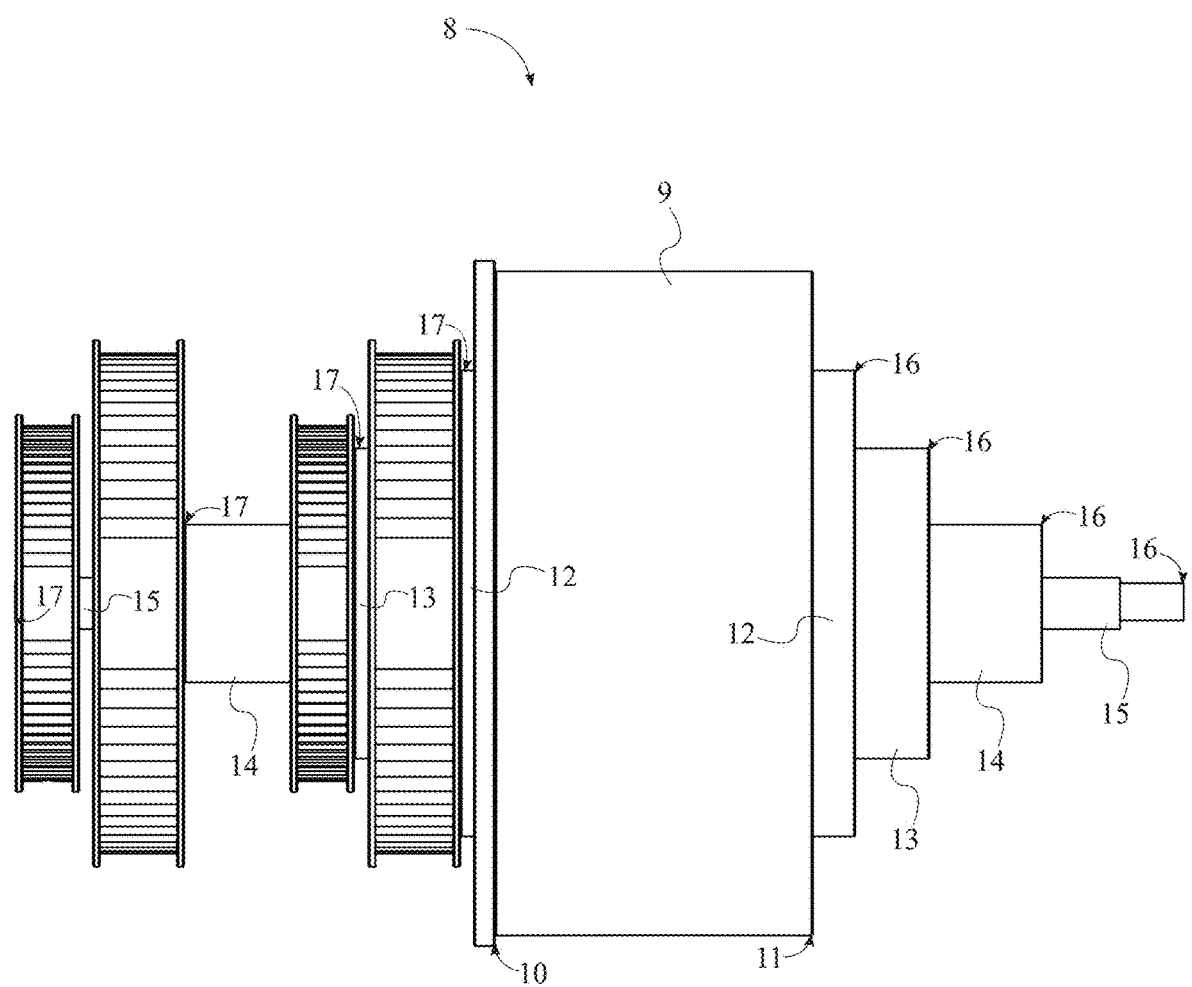
FIG. 5 is a front view of the shaft assembly of a movement module of the present invention.
Figure 6:
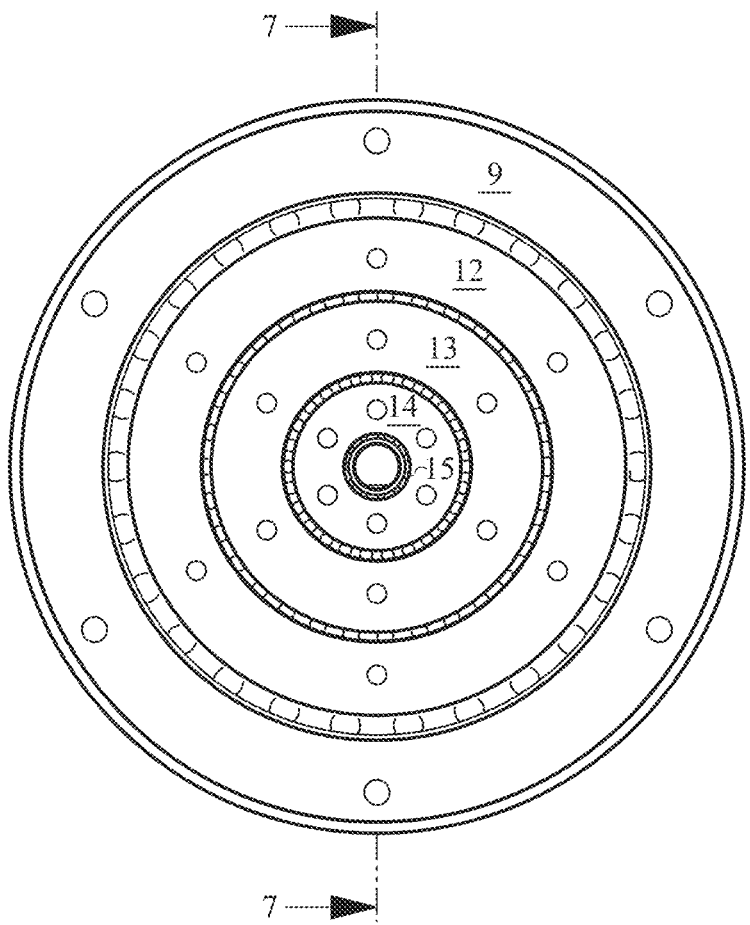
FIG. 6 is a side view of the shaft assembly of a movement module of the present invention.
Figure 7:
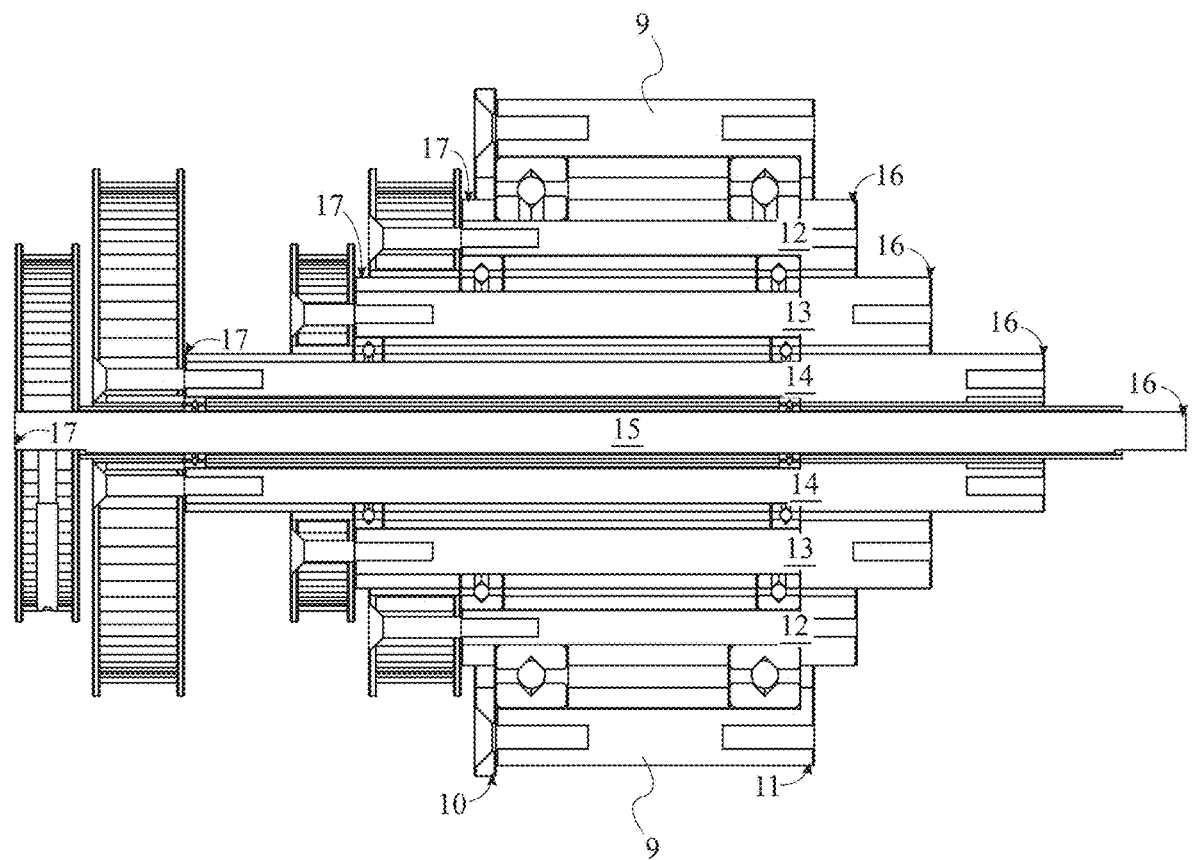
FIG. 7 is a vertical cross-sectional view taken along line 7-7 shown in FIG. 6.
Figure 8:
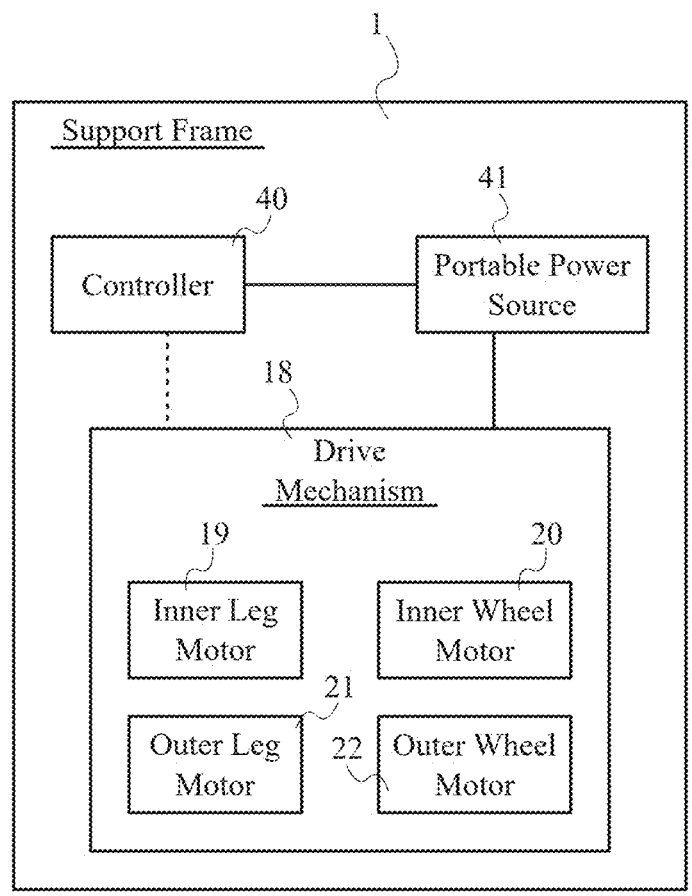
FIG. 8 is a block diagram showing the electrical connections and the electronic connections of the system of the present invention, wherein the electrical connections are shown in solid lines, and wherein the electronic connections are shown in dashed lines.
Figure 9:
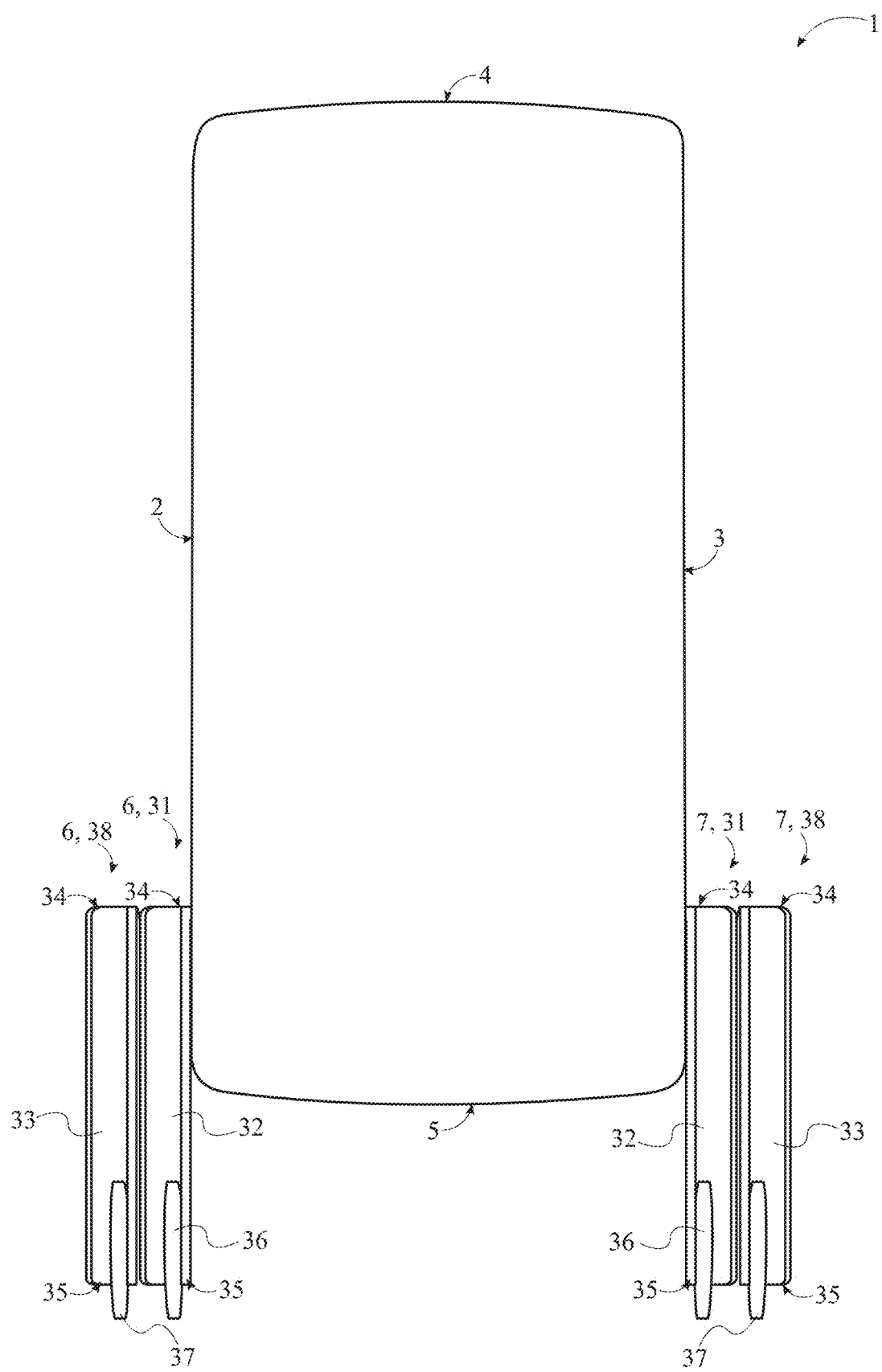
FIG. 9 is a front view of the system of the present invention, wherein the support frame of the present invention is shown covered in an exemplary housing.
Figure 10:
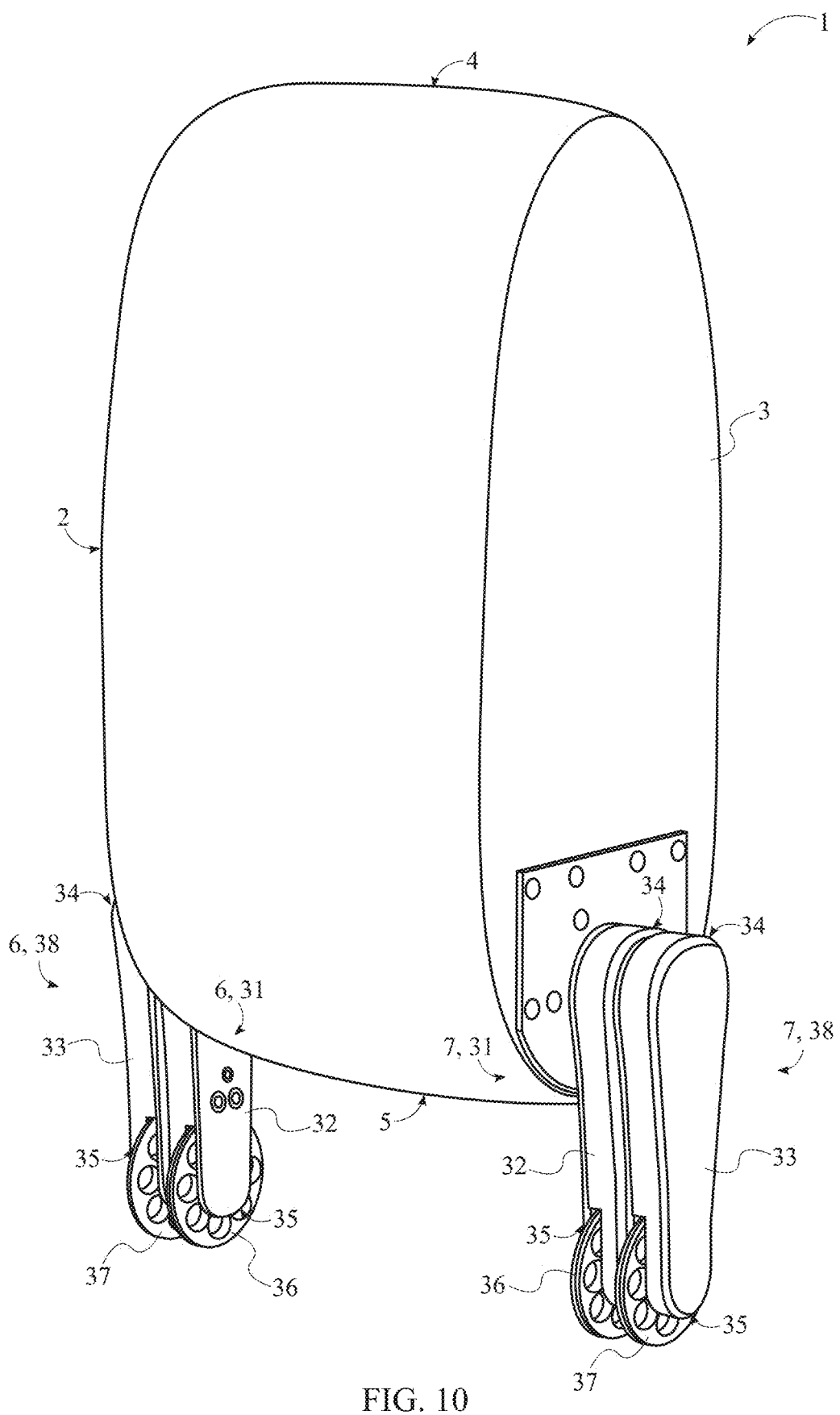
FIG. 10 is a top front perspective view thereof.
Figure 11:
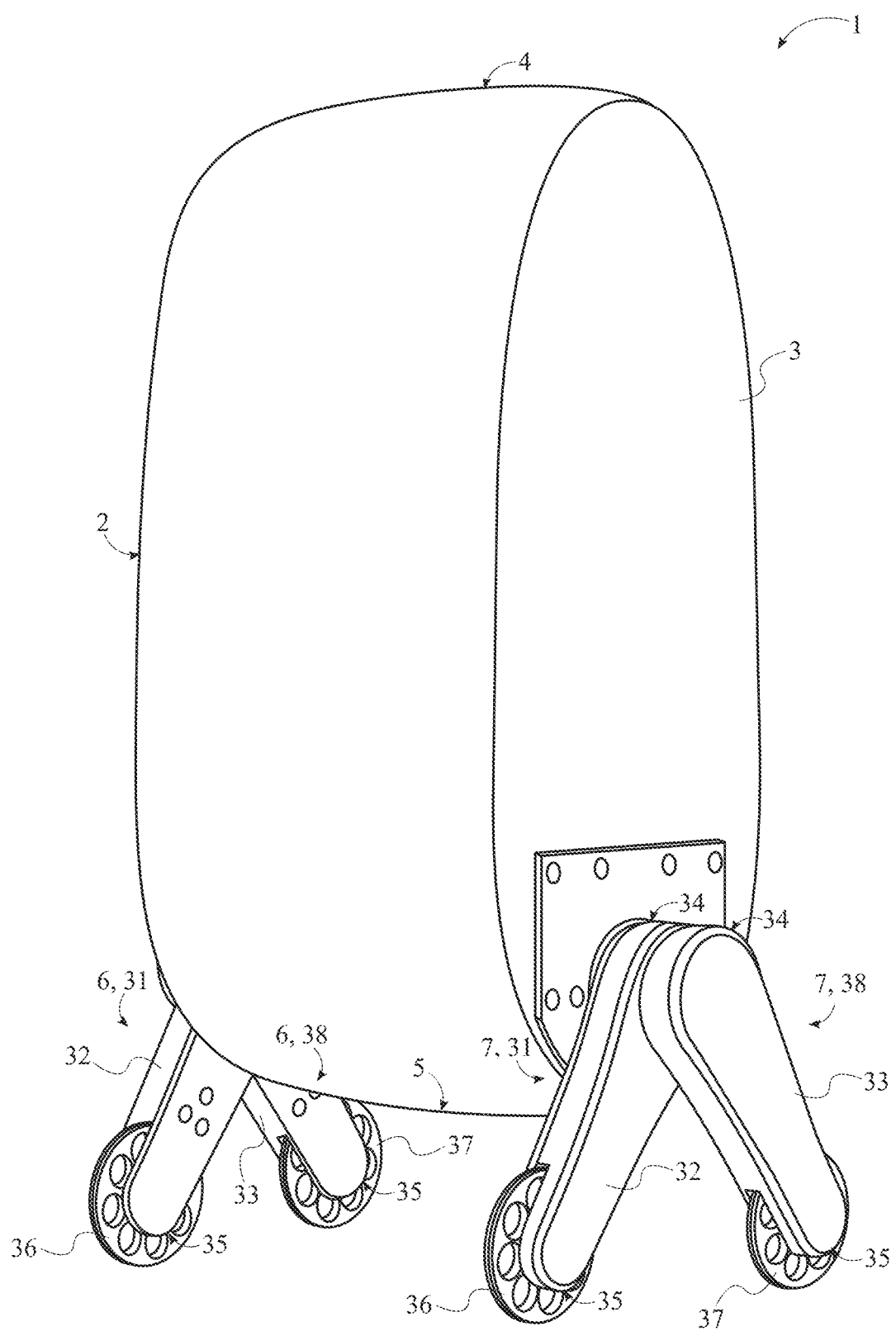
FIG. 11 is a top front perspective view thereof, wherein the inner wheeled legs and the outer wheeled legs are shown separated from each other at an acute angle.

All illustrations of the drawings are for the purpose of describing selected versions of the present invention and are not intended to limit the scope of the present invention.

The present invention discloses a system and method for facilitating the traversing of stairs of a wheeled robot. As can be seen in FIG. 1 through 12, the system of the present invention comprises a support frame 1, a first movement module 6, and a second movement module 7. The support frame 1 corresponds to the support structure of the wheeled robot that enables the operation of the first movement module 6 and the second movement module 7. The first movement module 6 and the second movement module 7 enable the wheeled robot to quickly and efficiently move along a flat surface. In addition, the first movement module 6 and the second movement module 7 are designed to enable the wheeled robot to traverse stairs without compromising the movement of the wheeled robot on flat surfaces.

The general configuration of the aforementioned components enables a wheeled robot to freely move in target locations that may include one or more stairs. As can be seen in FIG. 1 through 12, the support frame 1 can have different designs that accommodate different robotic features or payloads according to the application of the wheeled robot. In general, the support frame 1 comprises a first lateral side 2, a second lateral side 3, an upper section 4, and a lower section 5. The first lateral side 2 and the second lateral side 3 correspond to the opposite lateral sides of the support frame 1. The upper section 4 corresponds to the section of the support frame 1 that is often kept elevated from the ground, while the lower section 5 corresponds to the section of the support frame 1 that is kept close to the ground. In addition, the first movement module 6 and the second movement module 7 each comprises a shaft assembly 8, a drive mechanism 18, an inner wheeled leg 31, and an outer wheeled leg 38. The shaft assembly 8 corresponds to the structure that enables the independent rotation of the corresponding inner wheeled leg 31 and outer wheeled leg 38. The drive mechanism 18 generates the torque necessary for the individual rotation of the corresponding inner wheeled leg 31 and outer wheeled leg 38. Each inner wheeled leg 31 and each outer wheeled leg 38 are designed to enable the movement of the wheeled robot on flat surfaces as well as to enable the wheeled robot to traverse stairs.

In the preferred embodiment, the present invention can be arranged as follows: the shaft assembly 8 of the first movement module 6 and the shaft assembly 8 of the second movement module 7 are axially aligned with each other, as can be seen in FIG. 1 through 12. This way, the rotation of each inner wheeled leg 31 and each outer wheeled leg 38 occurs in the same axis of rotation to facilitate the balancing of the support frame 1 and the rest of the wheeled robot structure. Further, the shaft assembly 8 of the first movement module 6 is mounted onto the first lateral side 2, adjacent to the lower section 5, while the shaft assembly 8 of the second movement module 7 is mounted onto the second lateral side 3, also adjacent to the lower section 5. This way, the support structure is evenly supported by the first movement module 6 and the second movement module 7 on both sides. In addition, each inner wheeled leg 31 and each outer wheeled leg 38 are positioned parallel to each other so the rotation of each wheeled leg does not obstruct the rotation of the adjacent wheeled leg. Further, each inner wheeled leg 31 is positioned external and adjacent to the support frame 1, while each outer wheeled leg 38 is positioned external and opposite to the support frame 1 across the corresponding inner wheeled leg 31. This way, pairs of wheeled legs are formed on each side of the support frame 1, with the inner wheeled leg 31 being positioned in between the support frame 1, and the outer wheeled leg 38.

As can be seen in FIG. 1 through 12, each inner wheeled leg 31 and each outer wheeled leg 38 are rotatably connected to the corresponding shaft assembly 8 so that each wheeled leg of the corresponding movement module can rotate independently. Further, each inner wheeled leg 31 and each outer wheeled leg 38 are torsionally and operatively connected to the drive mechanism 18 by the corresponding shaft assembly 8, wherein each inner wheeled leg 31 and each outer wheeled leg 38 are independently rotated by the drive mechanism 18. By facilitating the independent rotation of each wheeled leg, the wheeled robot can easily and efficiently traverse stairs. In the preferred embodiment, the system of the present invention can rotate the wheeled legs in such a way that a pair of wheeled legs is used to balance the support frame 1, while another pair of wheeled legs is used to move the support frame 1 towards the next step on the stairs. Each pair of wheeled legs can be formed using the inner wheeled legs 31, the outer wheeled legs 38, or a combination thereof. In other embodiments, additional wheeled legs can be implemented on each movement module.

As can be seen in FIG. 1 through 12, to facilitate the independent rotation of each wheeled leg, each shaft assembly 8 includes several tubular concentric shafts, wherein each shaft rotates a corresponding wheeled leg. In the preferred embodiment, each shaft assembly 8 comprises a shaft sleeve 9 and an inner leg tubular shaft 12. The shaft sleeve 9 corresponds to the outer structure of the corresponding shaft assembly 8 that retains the internal shafts in such a way that each internal shaft can freely rotate within the shaft sleeve 9. The inner leg tubular shaft 12 corresponds to the internal shaft that enables the independent rotation of the corresponding inner wheeled leg 31. Both the shaft sleeve 9 and the inner leg tubular shaft 12 are elongated tubular structures, with the outer diameter of the inner leg tubular shaft 12 being smaller than the inner diameter of the shaft sleeve 9. The shaft sleeve 9 comprises an inner sleeve end 10 and an outer sleeve end 11 corresponding to the terminal ends of the shaft sleeve 9. Further, each inner wheeled leg 31 is designed as an elongated flat leg with a wheel connected at one end. So, each inner wheeled leg 31 comprises an inner leg body 32 and an inner leg wheel 36. The inner leg body 32 corresponds to the main structure of the inner wheeled leg 31 and comprises a proximal leg end 34 and a distal leg end 35 corresponding to the terminal ends of the inner leg body 32.

In the preferred embodiment, the inner wheeled leg 31 and the inner leg tubular shaft 12 can be arranged as follows: the inner sleeve end 10 is positioned within the support frame 1, while the outer sleeve end 11 is positioned external to the support frame 1, as can be seen in FIG. 1 through 12. This way, the shaft sleeve 9 traverses into the support frame 1 from the corresponding lateral side without restricting the rotation of the internal shafts. Further, the inner leg tubular shaft 12 is rotatably mounted within the shaft sleeve 9 so that the inner leg tubular shaft 12 is retained by the shaft sleeve 9 while being able to rotate within the shaft sleeve 9. For example, a ball bearing mechanism can be utilized to facilitate the rotation of the inner leg tubular shaft 12 within the shaft sleeve 9. Further, the proximal leg end 34 of the inner leg body 32 is torsionally connected to the inner leg tubular shaft 12, adjacent to the outer sleeve end 11. This allows the inner leg body 32 to be rotated by the inner leg tubular shaft 12. Further, a rotational axis 39 of the inner leg wheel 36 is oriented parallel to a rotational axis 39 of the inner leg tubular shaft 12. This way, the rotation of the inner leg wheel 36 does not obstruct the rotation of the inner leg body 32, and vice versa. Furthermore, the inner leg wheel 36 is rotatably connected to the distal leg end 35 of the inner leg body 32 so that the inner leg wheel 36 can freely rotate on the inner leg body 32.

As previously discussed, each inner wheeled leg 31 can operate without external aid. As can be seen in FIG. 1 through 12, each drive mechanism 18 comprises an inner leg motor 19 that drives the rotation of the corresponding inner wheeled leg 31. The inner leg motor 19 is preferably an electric motor with a rotor 23 and a stator 24. The rotor 23 corresponds to the static portion of the motor, while the rotor 23 corresponds to the moving portion of the motor. To implement the inner leg motor 19, the stator 24 of the inner leg motor 19 is mounted within the support frame 1, offset to the inner leg tubular shaft 12, so that the inner leg motor 19 is secured to the support frame 1. On the other hand, the rotor 23 of the inner leg motor 19 is torsionally connected to the inner leg tubular shaft 12, adjacent to the inner sleeve end 10. This way, the torque generated by the inner leg motor 19 is used to rotate the inner leg tubular shaft 12, which in turn rotates the inner leg body 32.

As can be seen in FIG. 1 through 12, the inner leg motor 19 can be connected to the inner leg tubular shaft 12 in different ways depending on the application of the wheeled robot. In the preferred embodiment, each drive mechanism 18 may further comprise an inner leg torque-transmitting mechanism 25 that enables the transmission of the torque generated by the inner leg motor 19 to the corresponding inner leg tubular shaft 12. To implement the inner leg torque-transmitting mechanism 25, the inner leg tubular shaft 12 comprises an outer shaft end 16 and an inner shaft end 17 corresponding to the terminal ends of the inner leg tubular shaft 12. The inner leg tubular shaft 12 is preferably longer than the shaft sleeve 9 to enable the implementation of the inner leg torque-transmitting mechanism 25. So, the outer shaft end 16 of the inner leg tubular shaft 12 is positioned external to the shaft sleeve 9, adjacent to the outer sleeve end 11. On the other hand, the inner shaft end 17 of the inner leg tubular shaft 12 is positioned external to the shaft sleeve 9, adjacent to the inner sleeve end 10.

Further, the proximal leg end 34 of the inner leg body 32 is torsionally connected to the outer shaft end 16 of the inner leg tubular shaft 12, as can be seen in FIG. 1 through 12. In addition, the rotor 23 of the inner leg motor 19 is torsionally connected to the inner shaft end 17 of the inner leg tubular shaft 12 by the inner leg torque-transmitting mechanism 25. This way, the torque generated by the inner leg motor 19 is transmitted to the inner leg tubular shaft 12, which rotates the inner leg body 32. Different types of mechanisms can be utilized for the torque-transmitting mechanism. For example, the inner leg torque-transmitting mechanism 25 can be a timing belt and timing belt pulley assembly. The timing belt pulley is incorporated on the inner shaft end 17 of the inner leg tubular shaft 12, and the timing belt connects the timing belt pulley to the rotor 23 of the inner leg motor 19. In other embodiments, different mechanisms can be implemented, such as a gearing system.

In the preferred embodiment, the inner leg wheel 36 can also be rotated independently from the rotation of the inner leg body 32. As can be seen in FIG. 1 through 12, each shaft assembly 8 may further comprise an inner wheel tubular shaft 13 that rotates the inner leg wheel 36 separate from the inner leg body 32. In addition, each drive mechanism 18 may further comprise an inner wheel motor 20 that generates the torque necessary to drive the rotation of the inner wheel tubular shaft 13. Like the inner leg motor 19, the inner wheel motor 20 is an electric motor with a rotor 23 and a stator 24. To implement the inner wheel motor 20, the inner wheel tubular shaft 13 is rotatably mounted within the inner leg tubular shaft 12 so that the inner wheel tubular shaft 13 is retained within the inner leg tubular shaft 12 while being able to freely rotate. Likewise, a ball bearing mechanism can be implemented to facilitate the rotation of the inner wheel tubular shaft 13 within the inner leg tubular shaft 12. Further, the stator 24 of the inner wheel motor 20 is mounted within the support frame 1, offset to the inner wheel tubular shaft 13, to secure the inner wheel motor 20 to the support frame 1. On the other hand, the rotor 23 of the inner wheel motor 20 is torsionally connected to the inner wheel tubular shaft 13, adjacent to the inner sleeve end 10, so that the inner wheel motor 20 can drive the rotation of the inner wheel tubular shaft 13. Furthermore, the inner leg wheel 36 is torsionally connected to the inner wheel tubular shaft 13, adjacent to the outer sleeve end 11, so that the rotation of the inner leg wheel 36 is independently driven by the inner wheel motor 20.

Similar to the inner leg motor 19, the inner wheel motor 20 can be directly or indirectly connected to the inner wheel tubular shaft 13 to transmit the generated torque. As can be seen in FIG. 1 through 12, each drive mechanism 18 may further comprise a first inner wheel torque-transmitting device 26 and a second inner wheel torque-transmitting device 27. The first inner wheel torque-transmitting device 26 allows the torque transmission between the inner wheel motor 20 and the inner wheel tubular shaft 13, while the second inner wheel torque-transmitting device 27 allows the torque transmission the inner wheel tubular shaft 13 and the inner leg wheel 36. To accommodate both inner wheel torque-transmitting devices, the inner wheel tubular shaft 13 comprises an outer shaft end 16 and an inner shaft end 17 corresponding to the terminal ends of the inner wheel tubular shaft 13.

As can be seen in FIG. 1 through 12, the first inner wheel torque-transmitting device 26 and the second inner wheel torque-transmitting device 27 are implemented as follows: the inner wheel tubular shaft 13 is preferably longer than the inner leg tubular shaft 12 to accommodate both inner wheel torque-transmitting devices on the corresponding tubular shafts. So, the outer shaft end 16 of the inner wheel tubular shaft 13 is positioned external to the inner leg tubular shaft 12, offset to the outer sleeve end 11. On the other hand, the inner shaft end 17 of the inner wheel tubular shaft 13 is positioned external to the inner leg tubular shaft 12, offset to the inner sleeve end 10. Further, the rotor 23 of the inner wheel motor 20 is torsionally connected to the inner shaft end 17 of the inner wheel tubular shaft 13 by the first inner wheel torque-transmitting device 26. This way, the torque generated by the inner wheel motor 20 is transmitted to the inner wheel tubular shaft 13. On the other hand, the outer shaft end 16 of the inner wheel tubular shaft 13 is torsionally connected to the inner leg wheel 36 by the second inner wheel torque-transmitting device 27. Thus, the rotation of the inner wheel tubular shaft 13 is used to rotate the inner leg wheel 36.

Like before, different types of mechanisms can be utilized for each inner wheel torque-transmitting device. For example, each inner wheel torque-transmitting device can be a timing belt and timing belt pulley assembly. The timing belt pulley is incorporated on each shaft end of the inner wheel tubular shaft 13. One timing belt connects a timing belt pulley to the rotor 23 of the inner wheel motor 20, while the other timing belt connects the other timing belt pulley to the inner leg wheel 36. In other embodiments, different mechanisms can be implemented, such as gearing systems.

Similar to each inner wheeled leg 31, each outer wheeled leg 38 can be independently rotated. As can be seen in FIG. 1 through 12, to facilitate the independent rotation of each outer wheeled leg 38, each shaft assembly 8 may further comprise an outer leg tubular shaft 14. The outer leg tubular shaft 14 corresponds to the internal shaft that enables the independent rotation of the corresponding outer wheeled leg 38. Like the inner leg tubular shaft 12, the outer leg tubular shaft 14 is an elongated tubular structure that is rotatably mounted within the inner leg tubular shaft 12. Further, like the inner wheeled legs 31, each outer wheeled leg 38 is designed as an elongated flat leg with a wheel connected at one end. So, each outer wheeled leg 38 comprises an outer leg body 33 and an outer leg wheel 37. The outer leg body 33 corresponds to the main structure of the outer wheeled leg 38 and comprises a proximal leg end 34 and a distal leg end 35 corresponding to the terminal ends of the outer leg body 33.

As can be seen in FIG. 1 through 12, in the preferred embodiment, the outer wheeled leg 38 and the outer leg tubular shaft 14 can be arranged as follows: the outer leg tubular shaft 14 is rotatably mounted within the shaft sleeve 9 so that the outer leg tubular shaft 14 is retained by the shaft sleeve 9 while being able to rotate within the shaft sleeve 9. Like before, a ball bearing mechanism can be implemented to allow the free rotation of the outer leg tubular shaft 14 within the shaft sleeve 9. The outer diameter of the outer leg tubular shaft 14 is smaller than the inner diameter of the inner wheel tubular shaft 13. Further, the proximal leg end 34 of the outer leg body 33 is torsionally connected to the outer leg tubular shaft 14, adjacent to the outer sleeve end 11. This allows the outer leg body 33 to be rotated by the outer leg tubular shaft 14. Further, a rotational axis 39 of the outer leg wheel 37 is oriented parallel to a rotational axis 39 of the outer leg tubular shaft 14. This way, the rotation of the outer leg wheel 37 does not obstruct the rotation of the outer leg body 33, and vice versa. Furthermore, the outer leg wheel 37 is rotatably connected to the distal leg end 35 of the outer leg body 33 so that the outer leg wheel 37 can freely rotate on the outer leg body 33.

As previously discussed, each outer wheeled leg 38 can operate without external aid. As can be seen in FIG. 1 through 12, each drive mechanism 18 comprises an outer leg motor 21 that drives the rotation of the corresponding outer wheeled leg 38. The outer leg motor 21 is preferably an electric motor with a rotor 23 and a stator 24. To implement the outer leg motor 21, the stator 24 of the outer leg motor 21 is mounted within the support frame 1, offset to the outer leg tubular shaft 14, to secure the outer leg motor 21 to the support frame 1. On the other hand, the rotor 23 of the outer leg motor 21 is torsionally connected to the outer leg tubular shaft 14, adjacent to the inner sleeve end 10. This way, the torque generated by the outer leg motor 21 is used to rotate the outer leg tubular shaft 14, which in turn rotates the outer leg body 33.

As can be seen in FIG. 1 through 12, like the inner leg motor 19, the outer leg motor 21 can be connected to the outer leg tubular shaft 14 in different ways depending on the application of the wheeled robot. In the preferred embodiment, each drive mechanism 18 may further comprise an outer leg torque-transmitting mechanism 28 that enables the transmission of the torque generated by the outer leg motor 21 to the corresponding outer leg tubular shaft 14. To implement the outer leg torque-transmitting mechanism 28, the outer leg tubular shaft 14 comprises an outer shaft end 16 and an inner shaft end 17 corresponding to the terminal ends of the outer leg tubular shaft 14. The outer leg tubular shaft 14 is preferably longer than the shaft sleeve 9 and the inner wheel tubular shaft 13 to enable the implementation of the outer leg torque-transmitting mechanism 28. So, the outer shaft end 16 of the outer leg tubular shaft 14 is positioned external to the inner wheel tubular shaft 13, adjacent to the outer sleeve end 11. On the other hand, the inner shaft end 17 of the outer leg tubular shaft 14 is positioned external to the inner wheel tubular shaft 13, adjacent to the inner sleeve end 10.

As can be seen in FIG. 1 through 12, the proximal leg end 34 of the outer leg body 33 is further torsionally connected to the outer shaft end 16 of the outer leg tubular shaft 14. In addition, the rotor 23 of the outer leg motor 21 is torsionally connected to the inner shaft end 17 of the outer leg tubular shaft 14 by the outer leg torque-transmitting mechanism 28. This way, the torque generated by the outer leg motor 21 is transmitted to the outer leg tubular shaft 14, which rotates the outer leg body 33. Different types of mechanisms can be utilized to transmit the torque from the outer leg motor 21. For example, the outer leg torque-transmitting mechanism 28 can be a timing belt and timing belt pulley assembly. The timing belt pulley is incorporated on the inner shaft end 17 of the outer leg tubular shaft 14, and the timing belt connects the timing belt pulley to the rotor 23 of the outer leg motor 21. In other embodiments, different mechanisms can be implemented, such as a gearing system.

In the preferred embodiment, the outer leg wheel 37 can also be rotated independently from the rotation of the outer leg body 33. As can be seen in FIG. 1 through 12, each shaft assembly 8 may further comprise an outer wheel tubular shaft 15 that rotates the outer leg wheel 37 separate from the outer leg body 33. In addition, each drive mechanism 18 may further comprise an outer wheel motor 22 that generates the torque necessary to drive the rotation of the outer wheel tubular shaft 15. Like the outer leg motor 21, the outer wheel motor 22 is an electric motor with a rotor 23 and a stator 24. To implement the outer wheel motor 22, the outer wheel tubular shaft 15 is rotatably mounted within the outer leg tubular shaft 14 so that the outer wheel tubular shaft 15 is retained within the outer leg tubular shaft 14 while being able to freely rotate. Further, the stator 24 of the outer wheel motor 22 is mounted within the support frame 1, offset to the outer wheel tubular shaft 15, to secure the outer wheel motor 22 to the support frame 1. On the other hand, the rotor 23 of the outer wheel motor 22 is torsionally connected to the outer wheel tubular shaft 15, adjacent to the inner sleeve end 10, so that the outer wheel motor 22 can drive the rotation of the outer wheel tubular shaft 15. Furthermore, the outer leg wheel 37 is torsionally connected to the outer wheel tubular shaft 15, adjacent to the outer sleeve end 11, so that the rotation of the outer leg wheel 37 is driven by the outer wheel motor 22.

Similar to the outer leg motor 21, the outer wheel motor 22 can be directly or indirectly connected to the outer wheel tubular shaft 15 to transmit the generated torque. As can be seen in FIG. 1 through 12, each drive mechanism 18 may further comprise a first outer wheel torque-transmitting device 29 and a second outer wheel torque-transmitting device 30. The first outer wheel torque-transmitting device 29 allows the torque transmission between the outer wheel motor 22 and the outer wheel tubular shaft 15, while the second outer wheel torque-transmitting device 30 allows the torque transmission the outer wheel tubular shaft 15 and the outer leg wheel 37. To accommodate both outer wheel torque-transmitting devices, the outer wheel tubular shaft 15 comprises an outer shaft end 16 and an inner shaft end 17 corresponding to the terminal ends of the outer wheel tubular shaft 15.

As can be seen in FIG. 1 through 12, the first outer wheel torque-transmitting device 29 and the second outer wheel torque-transmitting device 30 are implemented as follows: the outer wheel tubular shaft 15 is preferably longer than the outer leg tubular shaft 14 to accommodate both outer wheel torque-transmitting devices. So, the outer shaft end 16 of the outer wheel tubular shaft 15 is positioned external to the outer leg tubular shaft 14, offset to the outer sleeve end 11. On the other hand, the inner shaft end 17 of the outer wheel tubular shaft 15 is positioned external to the outer leg tubular shaft 14, offset to the inner sleeve end 10. Further, the rotor 23 of the outer wheel motor 22 is torsionally connected to the inner shaft end 17 of the outer wheel tubular shaft 15 by the first outer wheel torque-transmitting device 29. This way, the torque generated by the outer wheel motor 22 is transmitted to the outer wheel tubular shaft 15. On the other hand, the outer shaft end 16 of the outer wheel tubular shaft 15 is torsionally connected to the outer leg wheel 37 by the second outer wheel torque-transmitting device 30. Thus, the rotation of the outer wheel tubular shaft 15 is used to independently rotate the outer leg wheel 37.

Like before, different types of mechanisms can be utilized for each outer wheel torque-transmitting device. For example, each outer wheel torque-transmitting device can be a timing belt and timing belt pulley assembly. The timing belt pulley is incorporated on each shaft end of the outer wheel tubular shaft 15. One timing belt connects a timing belt pulley to the rotor 23 of the outer wheel motor 22, while the other timing belt connects the other timing belt pulley to the outer leg wheel 37. In other embodiments, different mechanisms can be implemented, such as gearing systems.

As previously discussed, the present invention can be implemented to enable the autonomous operation of the wheeled motor. As can be seen in FIG. 1 through 12, the present invention may further comprise a controller 40 and a portable power source 41. The controller 40 is part of a control module of the wheeled robot that stores the operating software necessary for the autonomous or semiautonomous operation of the wheeled robot. The control module can include several components that enable the autonomous or semiautonomous navigation of the wheeled robot including, but not limited to, environmental sensors, an Inertial Measurement Unit (IMU), an accelerometer, etc. The portable power source 41 provides the electricity necessary for the operation of the wheeled robot without direct connection to an external power source. In general, the controller 40 and the portable power source 41 are mounted within the support frame 1 so that the wheeled robot can freely move without obstructions from wiring. Further, each drive mechanism 18 is electronically connected to the controller 40 to enable the transmission of the necessary signals between the controller 40 and each drive mechanism 18. Furthermore, the controller 40 and each drive mechanism 18 are electrically connected to the portable power source 41 to distribute the electricity to the appropriate electrical components.

Figure 12:
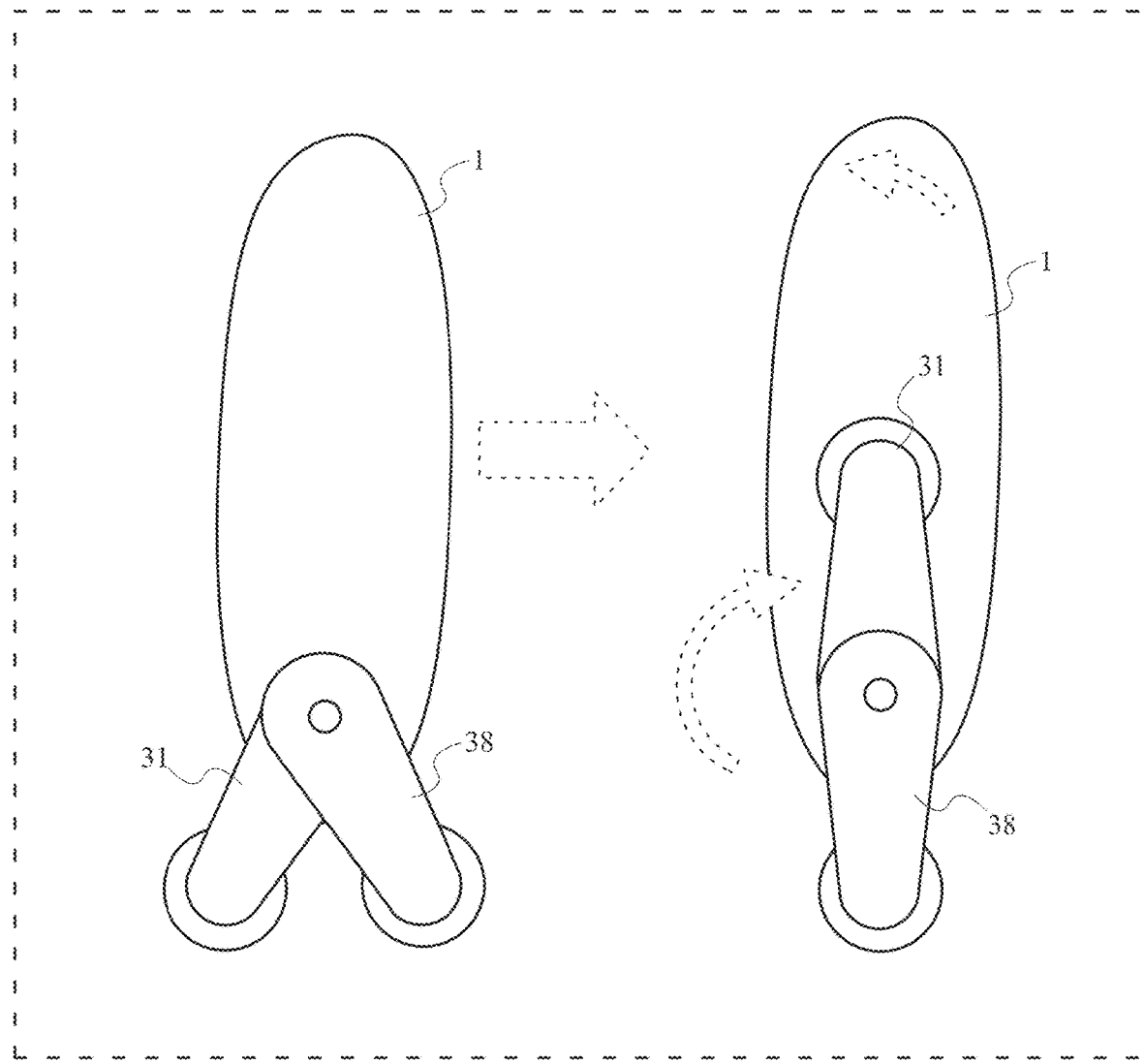
FIG. 12 is a side schematic view showing the system of the present invention, wherein the present invention is shown in a quadrupedal configuration and in a bipedal configuration for movement on a flat surface.

As previously discussed, the system of the present invention enables the wheeled robot to move on flat surfaces. As can be seen in FIG. 12, when moving on flat surfaces, the wheeled robot can be arranged into a bipedal configuration or into a quadrupedal configuration. Both configurations allow the wheel robot to move on flat surfaces using the leg wheels of the corresponding wheeled legs. In the quadrupedal configuration, each inner wheeled leg 31 and each outer wheeled leg 38 is oriented towards the ground so that each inner leg wheel 36 and each outer leg wheel 37 can rotate on the ground. Each inner wheeled leg 31 and the corresponding outer wheeled leg 38 can be oriented at an angle with each other to form a stable base. The angle between the wheeled legs is large enough to form a stable surface with the wheeled legs and can be adjusted accordingly while moving. In the quadrupedal configuration, each inner wheeled leg 31 and each outer wheeled leg 38 equally supports the load from the support frame 1 and the rest of the robot structure. This allows the wheeled robot to quickly and efficiently move along flat surfaces. In the bipedal configuration, the wheeled robot can be balanced using the control module on a pair of wheeled legs when moving along flat surfaces to make faster maneuvers using prior known control techniques involving motors. The pair of wheeled legs is an arbitrary pair formed using the inner wheeled legs 31, the outer wheeled legs 38, or a combination thereof. The wheeled legs not in use are raised off the ground in such a manner that the unused wheeled legs do not affect the wheeled robot's balance on the arbitrary pair of wheeled legs. For example, the unused wheeled legs can be positioned parallel and adjacent to the support frame 1. In other embodiments, different configurations can be implemented when additional wheeled legs or other wheeled components are utilized.

Figure 13:
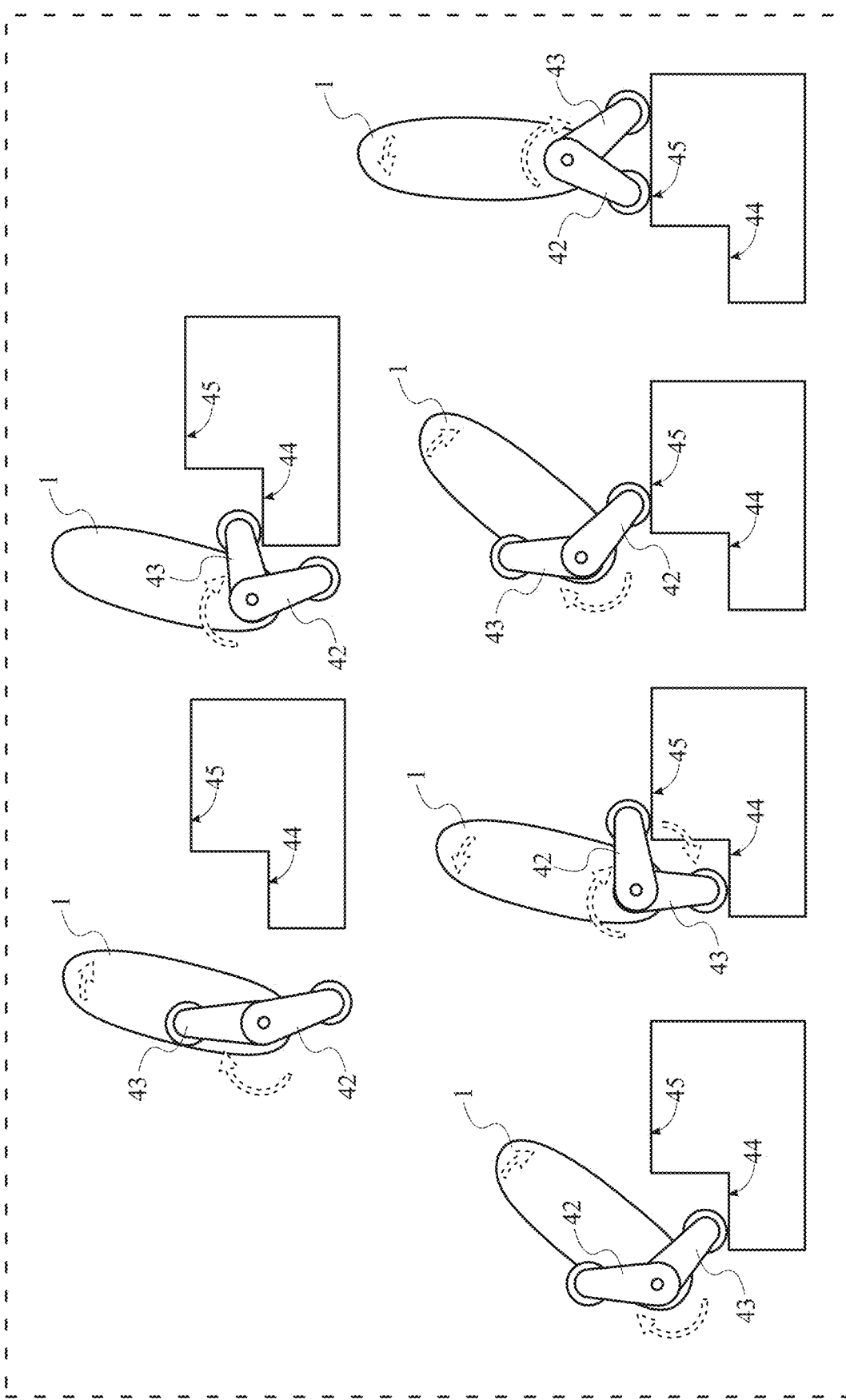
FIG. 13 is a side schematic view showing the overall process of the method of the present invention, wherein the wheeled robot is shown climbing a short flight of stairs, wherein a first pair of wheeled legs is shown formed using the outer wheeled legs, and wherein a second pair of wheeled legs is shown formed using the inner wheeled legs.
Figure 14:
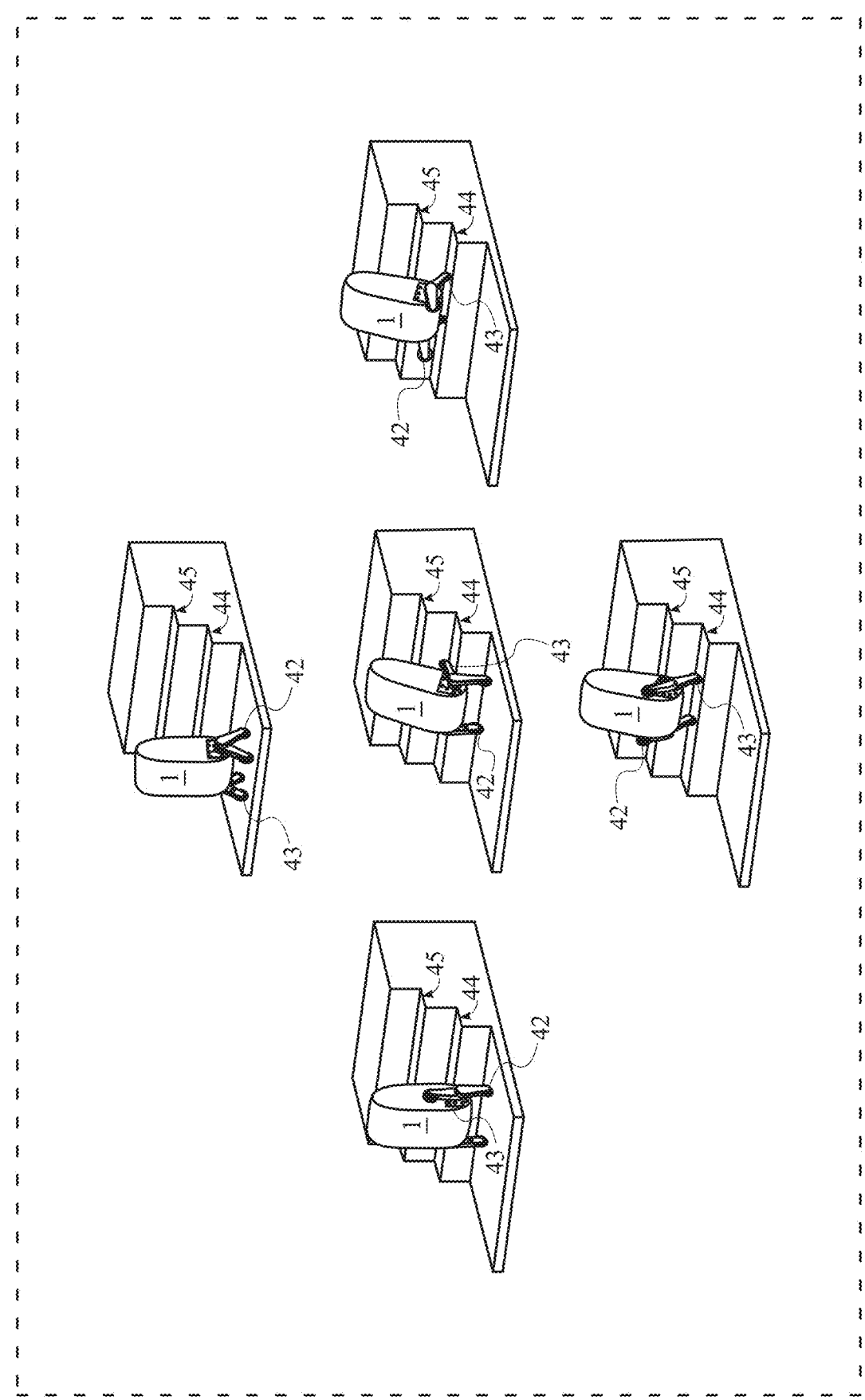
FIG. 14 is a perspective schematic view showing the overall process of the method of the present invention, wherein the wheeled robot is shown climbing a longer flight of stairs, wherein the first pair of wheeled legs is shown formed using the outer wheeled legs, and wherein the second pair of wheeled legs is shown formed using the inner wheeled legs.
Figure 15:
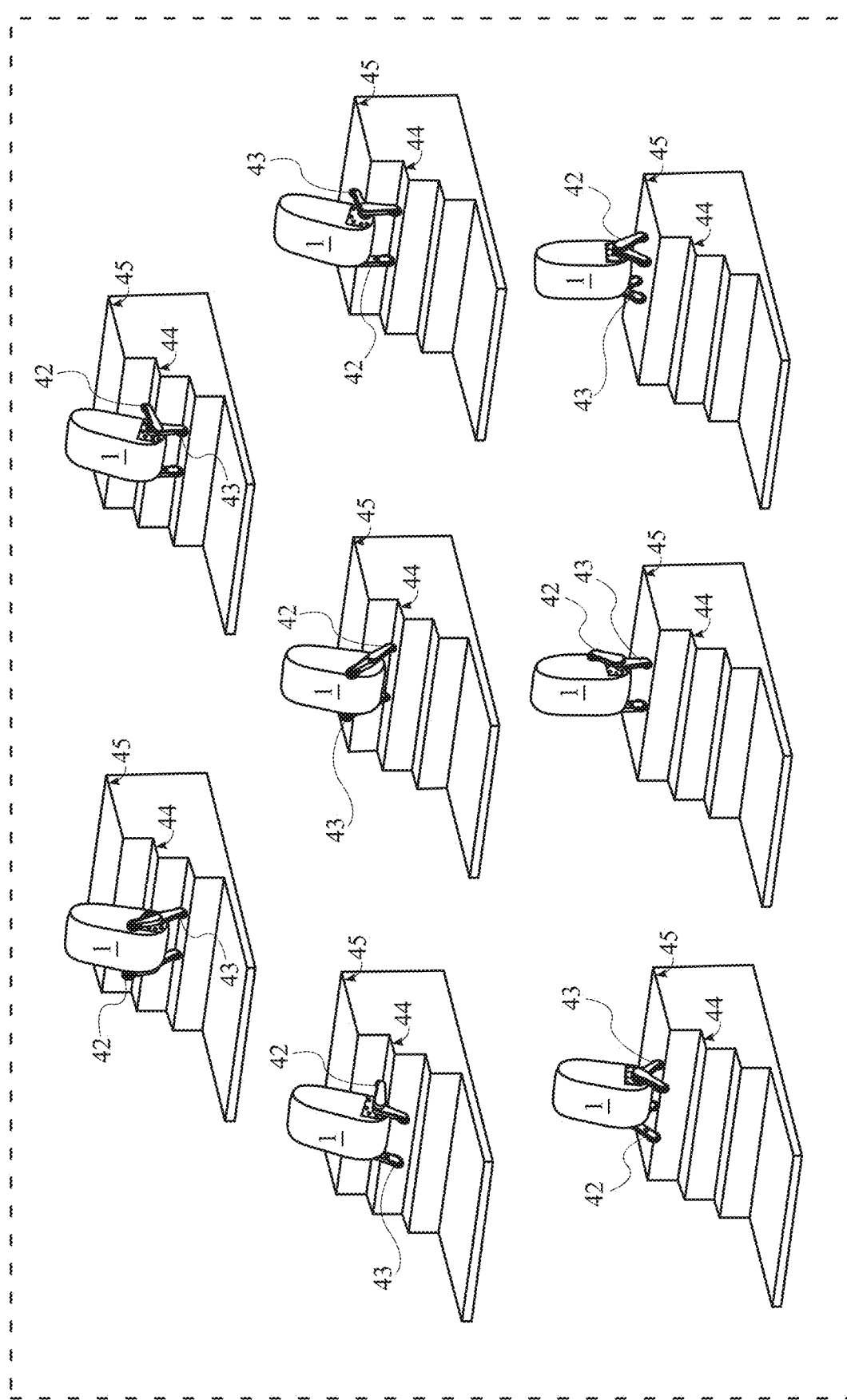
FIG. 15 is a perspective schematic view showing the continuation of the overall process of the method of the present invention shown in FIG. 14.

Further, the system of the present invention enables the implementation of the method of facilitating the traversing of stairs by the wheeled robot. As can be seen in FIG. 13 through 15, the method of the present invention involves moving the corresponding wheeled legs of each movement module in pairs. In the preferred embodiment, the wheeled legs of the first movement module 6 and the second movement module 7 are paired into a first pair of wheeled legs 42 and a second pair of wheeled legs 43 (Step A). The first pair of wheeled legs 42 and the second pair of wheeled legs 43 are arbitrarily formed from the inner wheeled legs 31, the outer wheeled legs 38, or a combination thereof. When the wheeled robot climbs a flight of stairs, one pair of wheeled legs serves as lifting legs to lift the wheeled robot to the next higher step, while the other pair of wheeled legs serves as balancing legs that balance the wheeled robot on the current step before climbing to the next higher step.

As can be seen in FIG. 13 through 15, the overall process of the method of the present invention begins by positioning the wheeled robot on a first flat floor adjacent to at least one flight of stairs (Step B). The first flat floor corresponds to any floor of a building structure that is connected to the flight of stairs. The first movement module 6 and the second movement module 7 can be used to move the wheeled robot across the first flat floor until the wheeled robot is positioned adjacent to the flight of stairs. Then, the support frame 1 is balanced on the first pair of wheeled legs 42 (Step C) using the controller 40 and the corresponding control module, which frees the second pair of wheeled legs 43 from supporting the support frame 1. Then, the support frame 1 is tilted in a first angular direction (Step D), wherein the first angular direction is oriented towards the flight of stairs. In other words, the support frame 1 leans forward to shift the center of gravity of the wheeled robot towards the flight of steps. Then, the second pair of wheeled legs 43 is rotated in the first angular direction (Step E), until the second pair of wheeled legs 43 engages an adjacent step 44 of the flight of stairs. When climbing the flight of stairs, the second pair of wheeled legs 43 is rotated forward to engage the adjacent step 44 which corresponds to a higher step on the stairs. During Step E, the second pair of wheeled legs 43 serves as the lifting legs, while the first pair of wheeled legs 42 serves as the balancing legs. The angle of rotation of second pair of wheeled legs 43 is sufficient to lift the first pair of wheeled legs 42 off the current surface such that the weight of the support frame 1 is carried on the second pair of wheeled legs 43.

As can be seen in FIG. 13 through 15, the support frame 1 is then balanced on the second pair of wheeled legs 43 (Step F) that are positioned on the adjacent step 44. During Step F, the second pair of wheeled legs 43 now serve as the balancing legs, while the first pair of wheeled legs 42 can then be used as the lifting legs. The support frame then tilts in the first angular direction (Step G), or uses the momentum of the support frame 1, to shift the weight of the wheeled robot onto the first pair of wheeled legs 42 that now serve as the lifting legs. The first pair of wheeled legs 42 is rotated in the first angular direction (Step H), until the first pair of wheeled legs 42 engages a subsequent step 45 of the flight of stairs. The amount that the support frame 1 must lean forward depends on the weight distribution of the wheeled robot and the speed at which the motion is made. The first pair of wheeled legs 42 rotate with respect to the support frame 1 to lift the entire wheeled robot from the adjacent step 44 onto the subsequent step 45. Then, a plurality of iterations of Steps C through H is performed until the wheeled robot traverses the flight of stairs.

During the repetitions of the process while traversing the flight of stairs, the pairs of wheeled legs swap functions continuously. As can be seen in FIG. 13 through 15, the lifting legs transition into the balancing legs when reaching the adjacent step 44, while the balancing legs transition into the lifting legs when moving onto the subsequent step 45. In the preferred embodiment, prior known techniques in the field of robotics, such as Proportional-Integral-Derivative (PID) control loops and the use of accelerometers or similar motion sensors, are used to keep the support frame 1 balanced upright on the balancing legs. Once the flight of stairs are fully traversed, the wheeled robot can transition into the bipedal configuration or the quadrupedal configuration so that the wheeled robot can move on a second flat floor, which is also connected to the flight of stairs opposite to the first flat floor. When descending the flight of stairs, the overall process is reversed, with the lifting legs now serving as lowering legs while the balancing legs still perform the same function. In other embodiments, different movement methods can be implemented that allow the system of the present invention to move along flat surfaces, to traverse stairs, or to step over obstacles.

When the balancing wheels are supporting the wheeled robot during the stair traversing process, the wheeled robot may need to move closer to the steps of the flight of stairs so that the lifting legs can securely engage the next step. This can occur when the wheeled robot is too far from the initial step of the flight of stairs, or when the design of the flight of stairs include wide steps. The subprocess of moving the wheeled robot when engaging the adjacent step 44 includes the steps of moving the support frame towards the adjacent step 44 during Step D using the leg wheels of the first pair of wheeled legs, if the wheeled robot is offset to the adjacent step 44. The corresponding wheel motors are engaged by the controller 40 as necessary to move the wheeled robot closer to the adjacent step 44. Then, the wheeled robot is stopped using the leg wheels of the first pair of wheeled legs 42 during Step E, if the second pair of wheeled legs 42 engages the adjacent step 44. Appropriate sensors or monitoring devices can be implemented to track the engagement of the lifting wheels with the adjacent step 44.

In a similar manner, the subprocess of moving the wheeled robot when engaging the subsequent step 45 includes the steps of moving the wheeled robot towards the subsequent step 45 during Step G using the leg wheels of the second pair of wheeled legs 43, if the wheeled robot is offset to the subsequent step 45. Like before, the corresponding wheel motors are engaged by the controller 40 as necessary to move the wheeled robot closer to the subsequent step 45. Then, the wheeled robot is stopped using the leg wheels of the second pair of wheeled legs 43 during Step H, if the first pair of wheeled legs 42 engages the subsequent step 45. In other embodiments, different maneuvers can be implemented to help the wheeled robot traverse the flight of stairs.

Although the invention has been explained in relation to its preferred embodiment, it is to be understood that many other possible modifications and variations can be made without departing from the spirit and scope of the invention.

What is claimed is:

1. A system for facilitating the traversing of stairs by a wheeled robot, the system comprising:
    a support frame;
    a first movement module;
    a second movement module;
    the support frame comprising a first lateral side, a second lateral side, an upper section, and a lower section;
    the first movement module and the second movement module each comprising a shaft assembly, a drive mechanism, an inner wheeled leg, and an outer wheeled leg;
    the shaft assembly of the first movement module and the shaft assembly of the second movement module being axially aligned with each other;
    the shaft assembly of the first movement module being mounted onto the first lateral side, adjacent to the lower section;
    the shaft assembly of the second movement module being mounted onto the second lateral side, adjacent to the lower section;
    each inner wheeled leg and each outer wheeled leg being positioned parallel and offset to each other;
    each inner wheeled leg being positioned external and adjacent to the support frame;
    each outer wheeled leg being positioned external and opposite to the support frame across the corresponding inner wheeled leg;
    each inner wheeled leg and each outer wheeled leg being rotatably connected to the corresponding shaft assembly;
    each inner wheeled leg and each outer wheeled leg being torsionally and operatively connected to the drive mechanism by the corresponding shaft assembly, wherein each inner wheeled leg and each outer wheeled leg are independently rotated by the drive mechanism;
    each shaft assembly comprising a shaft sleeve and an inner leg tubular shaft;

each inner wheeled leg comprising an inner les body and an inner lev wheel;

the shaft sleeve comprising an inner sleeve end and an outer sleeve end;

the inner leg body comprising a proximal leg end and a distal leg end;

the inner sleeve end being positioned within the support frame;

the outer sleeve end being positioned external to the support frame;

the inner leg tubular shaft being rotatably mounted within the shaft sleeve;

the proximal leg end of the inner leg body being torsionally connected to the inner lev tubular shaft, adjacent to the outer sleeve end;

a rotational axis of the inner leg wheel being oriented parallel to a rotational axis of the inner leg tubular shaft; and the inner leg wheel being rotatably connected to the distal leg end of the inner leg body.

2. The system as claimed in claim 1 further comprising:

each drive mechanism comprising an inner leg motor;

the inner leg motor comprising a rotor and a stator;

the stator of the inner leg motor being mounted within the support frame, offset to the inner leg tubular shaft; and the rotor of the inner leg motor being torsionally connected to the inner leg tubular shaft, adjacent to the inner sleeve end.

3. The system as claimed in claim 2 further comprising:

each drive mechanism further comprising an inner leg torque-transmitting mechanism;

the inner leg tubular shaft comprising an outer shaft end and an inner shaft end;

the outer shaft end of the inner leg tubular shaft being positioned external to the shaft sleeve, adjacent to the outer sleeve end;

the inner shaft end of the inner leg tubular shaft being positioned external to the shaft sleeve, adjacent to the inner sleeve end;

the proximal leg end of the inner leg body being torsionally connected to the outer shaft end of the inner leg tubular shaft; and the rotor of the inner leg motor being torsionally connected to the inner shaft end of the inner leg tubular shaft by the inner leg torque-transmitting mechanism.

4. The system as claimed in claim 1 further comprising:

each shaft assembly further comprising an inner wheel tubular shaft;

each drive mechanism further comprising an inner wheel motor;

the inner wheel motor comprising a rotor and a stator;

the inner wheel tubular shaft being rotatably mounted within the inner leg tubular shaft;

the stator of the inner wheel motor being mounted within the support frame, offset to the inner wheel tubular shaft;

the rotor of the inner wheel motor being torsionally connected to the inner wheel tubular shaft, adjacent to the inner sleeve end; and the inner leg wheel being torsionally connected to the inner wheel tubular shaft, adjacent to the outer sleeve end.

5. The system as claimed in claim 4 further comprising:

each drive mechanism further comprising a first inner wheel torque-transmitting device and a second inner wheel torque-transmitting device;

the inner wheel tubular shaft comprising an outer shaft end and an inner shaft end;

the outer shaft end of the inner wheel tubular shaft being positioned external to the inner leg tubular shaft, offset to the outer sleeve end;

the inner shaft end of the inner wheel tubular shaft being positioned external to the inner leg tubular shaft, offset to the inner sleeve end;

the rotor of the inner wheel motor being torsionally connected to the inner shaft end of the inner wheel tubular shaft by the first inner wheel torque-transmitting device; and the outer shaft end of the inner wheel tubular shaft being torsionally connected to the inner leg wheel by the second inner wheel torque-transmitting device.

6. The system as claimed in claim 1 further comprising:

each shaft assembly comprising a shaft sleeve and an outer leg tubular shaft;

each outer wheeled leg comprising an outer leg body and an outer leg wheel;

the shaft sleeve comprising an inner sleeve end and an outer sleeve end;

the outer leg body comprising a proximal leg end and a distal leg end;

the inner sleeve end being positioned within the support frame;

the outer sleeve end being positioned external to the support frame;

the outer leg tubular shaft being rotatably mounted within an inner wheel tubular shaft of the shaft assembly;

the proximal leg end of the outer leg body being torsionally connected to the outer leg tubular shaft, adjacent to the outer sleeve end;

a rotational axis of the outer leg wheel being oriented parallel to a rotational axis of the outer leg tubular shaft; and the outer leg wheel being rotatably connected to the distal leg end of the outer leg body.

7. The system as claimed in claim 6 further comprising:

each drive mechanism comprising an outer leg motor;

the outer leg motor comprising a rotor and a stator;

the stator of the outer leg motor being mounted within the support frame, offset to the outer leg tubular shaft; and the rotor of the outer leg motor being torsionally connected to the outer leg tubular shaft, adjacent to the inner sleeve end.

8. The system as claimed in claim 7 further comprising:

each drive mechanism further comprising an outer leg torque-transmitting mechanism;

the outer leg tubular shaft comprising an outer shaft end and an inner shaft end;

the outer shaft end of the outer leg tubular shaft being positioned external to the inner wheel tubular shaft of the shaft assembly, adjacent to the outer sleeve end;

the inner shaft end of the outer leg tubular shaft being positioned external to the inner wheel tubular shaft of the shaft assembly, adjacent to the inner sleeve end;

the proximal leg end of the outer leg body being torsionally connected to the outer shaft end of the outer leg tubular shaft; and the rotor of the outer leg motor being torsionally connected to the inner shaft end of the outer leg tubular shaft by the outer leg torque-transmitting mechanism.

9. The system as claimed in claim 6 further comprising:

each shaft assembly further comprising an outer wheel tubular shaft;

each drive mechanism further comprising an outer wheel motor;

the outer wheel motor comprising a rotor and a stator;

the outer wheel tubular shaft being rotatably mounted within the outer leg tubular shaft;

the stator of the outer wheel motor being mounted within the support frame, offset to the outer wheel tubular shaft;

the rotor of the outer wheel motor being torsionally connected to the outer wheel tubular shaft, adjacent to the inner sleeve end; and the outer leg wheel being torsionally connected to the outer wheel tubular shaft, adjacent to the outer sleeve end.

10. The system as claimed in claim 9 further comprising:

each drive mechanism further comprising a first outer wheel torque-transmitting device and a second outer wheel torque-transmitting device;

the outer wheel tubular shaft comprising an outer shaft end and an inner shaft end;

the outer shaft end of the outer wheel tubular shaft being positioned external to the outer leg tubular shaft, offset to the outer sleeve end;

the inner shaft end of the outer wheel tubular shaft being positioned external to the outer leg tubular shaft, offset to the inner sleeve end;

the rotor of the outer wheel motor being torsionally connected to the inner shaft end of the outer wheel tubular shaft by the first outer wheel torque-transmitting device; and the outer shaft end of the outer wheel tubular shaft being torsionally connected to the outer leg wheel by the second outer wheel torque-transmitting device.

11. The system as claimed in claim 1 further comprising:

a controller;

a portable power source;

the controller and the portable power source being mounted within the support frame;

each drive mechanism being electronically connected to the controller; and the controller and each drive mechanism being electrically connected to the portable power source.

* * * * *